(12) United States Patent
Mondal et al.

(10) Patent No.: US 11,217,379 B2
(45) Date of Patent: Jan. 4, 2022

(54) INDUCTOR ASSEMBLY

(71) Applicant: Siemens Aktiengesellschaft, Munich (DE)

(72) Inventors: Gopal Mondal, Erlangen (DE); Matthias Neumeister, Nuremberg (DE); Stefan Hänsel, Erlangen (DE); Jonathan Robinson, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/050,753

(22) PCT Filed: Apr. 16, 2019

(86) PCT No.: PCT/EP2019/059751
§ 371 (c)(1),
(2) Date: Oct. 26, 2020

(87) PCT Pub. No.: WO2019/206733
PCT Pub. Date: Oct. 31, 2019

(65) Prior Publication Data
US 2021/0233697 A1    Jul. 29, 2021

(30) Foreign Application Priority Data

Apr. 27, 2018   (EP) ..................... 18169864

(51) Int. Cl.
*H01F 27/26* (2006.01)
*H01F 27/28* (2006.01)
(Continued)

(52) U.S. Cl.
CPC ............ *H01F 27/26* (2013.01); *H01F 27/28* (2013.01); *H02M 7/003* (2013.01); *H02M 7/44* (2013.01)

(58) Field of Classification Search
CPC . H01F 17/04; H01F 3/14; H01F 27/26; H01F 27/263; H01F 27/28; H02M 7/003; H02M 3/285; H02M 7/44
See application file for complete search history.

(56) References Cited

U.S. PATENT DOCUMENTS 5,481,238 A  *  1/1996  Carsten .................... G05F 1/24
                                                          323/259
5,523,673 A  *  6/1996  Ratliff .................... G05F 1/325
                                                          323/206
(Continued)

FOREIGN PATENT DOCUMENTS

CN       101268604 A    9/2008    ............ H02M 3/335
CN       106787738 A    5/2017    ............. H02M 1/14
(Continued)

OTHER PUBLICATIONS

Search Report for International Application No. PCT/EP2019/059751, 11 pages, dated Jul. 23, 2019.
(Continued)

*Primary Examiner* — Adolf D Berhane
(74) *Attorney, Agent, or Firm* — Slayden Grubert Beard PLLC (57) ABSTRACT

Various embodiments include an inductor assembly for a converter comprising: a plurality of first conductors arranged on respective legs of a first magnetic core; a second magnetic core with one or more legs, the second core magnetically coupled to the first core via an air-gap and arranged to provide a path for common mode magnetic flux of the plurality of first conductors; and a respective second conductor corresponding to each of the plurality of first conductors. Each pair of first and second conductors is electrically connected in series. The second conductors are arranged on a single leg of the second core and positively coupled to each other.

15 Claims, 4 Drawing Sheets

(51) Int. Cl.
*H02M 7/00* (2006.01)
*H02M 7/44* (2006.01)

(56) References Cited

U.S. PATENT DOCUMENTS

| | | |
|---|---|---|
| 2006/0250207 A1 | 11/2006 | Shudarek .................... 336/212 |
| 2008/0247210 A1 | 10/2008 | Hu .............................. 363/131 |
| 2014/0125430 A1 | 5/2014 | Ichihara ................... H03H 7/01 |
| 2015/0123402 A1 | 5/2015 | Wagoner ................. H01F 30/06 |
| 2020/0388436 A1* | 12/2020 | Sattel ................. G01R 19/0092 |

FOREIGN PATENT DOCUMENTS

| | | | |
|---|---|---|---|
| EP | 1030450 A1 | 8/2000 | ........... H03K 19/017 |
| EP | 2 624 260 | 8/2013 | .............. H01F 3/10 |
| WO | 2013/026221 A1 | 2/2013 | .............. H02M 1/44 |
| WO | 2017/102005 A1 | 6/2017 | .............. H02M 1/12 |

OTHER PUBLICATIONS

Search Report for EP Application No. 18169864.8, 8 pages, dated Oct. 12, 2018.
CN 101268604 A US 2008/0247210 A1.
Chinese Office Action, Application No. 201980028670.5, 12 pages, dated Oct. 11, 2021.

* cited by examiner

INDUCTOR ASSEMBLY

CROSS-REFERENCE TO RELATED APPLICATIONS

This application is a U.S. National Stage Application of International Application No. PCT/EP2019/059751 filed Apr. 16, 2019, which designates the United States of America, and claims priority to EP Application No. 18169864.8 filed Apr. 27, 2018, the contents of which are hereby incorporated by reference in their entirety.

TECHNICAL FIELD

The present disclosure relates to converters. Various embodiments may include inductor assemblies, e.g., for a single or multi-phase and/or interleaved converter comprising a plurality of conductors.

BACKGROUND

Many types of converters, e.g. typical DC/AC converters with half-bridges supplying a DC input voltage in a pulse width modulation to generate an AC output produce electrical noise that is passed to a load or the grid and reduces voltage quality there which in turn may reduce performance or may even be hazardous to machinery. Inductive elements, i.e. conductors may be used in converters for filtering the AC voltage signal. Both differential mode noise, created from circulating current and common mode noise are points of consideration when an inductor for a converter is built. While the bulk and weight of inductive and capacitive elements depends on the specific converter parameters it is typical for these elements to make up a considerable part of the overall weight and size of a converter.

SUMMARY

The teachings of the present disclosure describe inductor assemblies with a reduced size. For example, some embodiments include an inductor assembly for a single or multi-phase and/or interleaved converter comprising a plurality of first conductors arranged on respective legs of a first magnetic core, wherein pairs of the first conductors are inversely coupled, i.e. they have identical winding directions, and a second core comprising one or more legs, the second core being magnetically coupled to the first core via air-gaps and arranged to provide a path for common mode magnetic flux.

As an example, some embodiments include an inductor assembly (100, 300, 400, 700) for a single or multi-phase and/or interleaved converter (500) comprising: a plurality of first conductors (112, 114, 116) arranged on respective legs of a first magnetic core (110), a second core (120, 320, 420, 600) comprising one or more legs (128, 328, 428, 602, 604, 606), the second core (120, 320, 420, 600) being magnetically coupled to the first core (110) via air-gaps and arranged to provide a path for common mode magnetic flux of the first conductors (112, 114, 116), and a second conductor (122, 124, 126) for each of the first conductors (112, 114, 116), the corresponding first and second conductor (112, 114, 116, 122, 124, 126) being electrically connected in series, the second conductors (122, 124, 126) being arranged on a single leg (328, 602, 604, 606) of the second core (120, 320, 600) and positively coupled to each other.

In some embodiments, pairs of the first conductors (112, 114, 116) are inversely coupled.

In some embodiments, the corresponding first and second conductor (112, 114, 116, 122, 124, 126) are positively coupled.

In some embodiments, the second core (320, 420) is LL shaped.

In some embodiments, the corresponding first and second conductors (112, 114, 116, 122, 124, 126) are inversely coupled and wherein the second core (120, 600) comprises at least two legs.

In some embodiments, the second core (120, 600) comprises exactly two legs.

In some embodiments, the second core (120) is FF shaped.

In some embodiments, the first magnetic core (110) comprises a first core material and wherein the second core (120, 600) comprises a second core material different from the first core material.

In some embodiments, the second core (120, 600) is arranged to substantially surround the first magnetic core (110).

In some embodiments, the second core (600) is shaped as a multi-leg core in a first direction and wherein a plurality of first cores (110) is arranged to extend in a second direction to be magnetically coupled to the legs of the second core (600).

In some embodiments, at the locations of the legs (602, 604, 606) the second core (600) is LL-shaped with the arms (630 . . . 635) of the LL shape extending in the second direction and the first cores (110) are arranged adjacent to the arms (630 . . . 635) of the LL shape.

In some embodiments, comprising one or a plurality of third cores (810) shaped like the second core (600) and arranged adjacent to the second core (600) in the second direction on a side opposite to the first cores (110).

As another example, some embodiments include a multiple phase converter with an inductor assembly (100, 300, 400, 700) as described herein, wherein the first core (110) has a leg for each of the phases and the first conductors (112, 114, 116) each correspond to one of the phases.

In some embodiments, the first core (110) is EE shaped with three legs.

As another example, some embodiments include a multiple phase interleaved converter (500) with a plurality of modules and an inductor assembly (100, 300, 400, 700) as described above, comprising a first core (110) for each of the modules, wherein the first conductors (112, 114, 116) on each of the first cores (110) correspond to a phase of the respective module, wherein the second core (600) comprises a leg (602, 604, 606) for each of the modules and the second conductors (122, 124, 126) on each leg (602, 604, 606) correspond to the respective module.

BRIEF DESCRIPTION OF THE DRAWINGS

Embodiments of the teachings of the present disclosure are described with reference to the accompanying drawings, in which.

The illustrations of the drawings are in schematic form. It is noted that in different figures, similar or identical elements use the same reference signs.

DETAILED DESCRIPTION

In an interleaved converter, the common mode magnetic flux may consist of the fundamental load current flux and the flux due to the noise current at N times of the switching frequency where N is the number of the parallel interleaved modules. In some embodiments of the teachings herein, the first conductors may be inversely coupled by being arranged in a similar manner, particularly wound in the same way, on parallel legs of the first magnetic core. When all of the first conductors are arranged in a similar manner on their respective legs of the first core each pair of the first conductors is inversely coupled. The first and second magnetic core each may comprise one or more air gaps or low permeability material separating individual parts of the cores.

The inductor assembly comprises a second conductor for each of the first conductors, the corresponding first and second windings being electrically connected in series, the second conductors being arranged on a single leg of the second core and positively coupled to each other. Further features that may be added alone or together in exemplary embodiments of the teachings herein include:

In some embodiments, the first core may be EE shaped (double-E shaped). In other words, the first core may comprise two parts separated by an air gap or low permeability material where both parts are shaped identically in the form of the capital letter E having a backside bar with equally spaced arms extending from the backside bar and wherein the parts are oriented to make the arms of the two E shapes point towards each other. The EE shape suggests exactly three arms and thus exactly three phases but the shape may have fewer or more than three arms and thus have room for more than three phases. Each pair of arms forms one leg of the first core.

In some embodiments, the corresponding first and second windings may be positively coupled. In this particular setup it is possible that the second core has exactly one leg. The second core may for example be LL shaped which means in a manner similar to EE shaped that the second core has two parts separated by an air gap or low permeability material where each part is shaped like a capital letter L and where the arms of the two parts face each other two form the single leg. In this setup a common mode magnetic flux may or must return through the leg that holds the second conductors.

In some embodiments, the number of turns of the conductors on the second core may be lower than the number of turns of the associated first conductors.

In some embodiments, the second core may comprise at least two legs or exactly two legs. The corresponding first and second windings may be inversely coupled. In this case a common mode magnetic flux may return through the additional leg of the second core that may not have any conductors arranged on it. As an analogue to the EE shaped core the second core may be FF shaped with two parts separated by an air gap or low permeability material where the open ends of the backside bars of the two capital letter F shapes point towards the first core.

In some embodiments, the second core may be shaped as a multi-leg core in a first direction. In some embodiments, a plurality of first cores is arranged to extend in a second direction to be magnetically coupled to the legs of the second core. In particular, the second direction may be perpendicular to the first direction and both may be perpendicular to the direction the legs extend in.

In other words, in contrast to a second core that has a two dimensional form such as an LL shape or FF shape and an associated overall thickness the second core of this embodiment has a fully three-dimensional structure. In a first plane formed by the direction of the legs and the first direction the second core has the shape of a multi-leg core, such as an EE shape, again not limited to three arms. This shape is not necessarily present in all such planes but only in a part of it. In a second plane formed by the direction of the legs and the second direction the second core may have an LL shape or an FF shape. Again this shape is not present for all planes that cut through the second core. It may be present for all planes that cut through one of the legs of the second core. The first cores are preferentially oriented along the second direction so that their multi-leg form such as the EE shape extends in the second plane. The first cores are preferentially arranged parallel to each other.

In some embodiments, at the locations of the legs the second core may be LL-shaped with the arms of the L shape extending in the second direction. Then first cores are arranged adjacent to the arms of the LL shape. Thus an intersection of the inductor assembly with a second plane that comprises one of the legs of the second core may have the same shape as an inductor assembly without a three dimensional second core.

In some embodiments, the inductor assembly may comprise a third core shaped like the second core and arranged adjacent to the second core in the second direction on a side opposite from the first cores. This setup is analogous to the conversion of an LL shaped second core to an FF shaped second core in that it adds a second leg, in this case a second leg per first leg.

In some embodiments, the first core will have a leg for each of the phases and the first conductors each correspond to one of the phases.

In some embodiments, the inductor assembly may be used in a multiple phase interleaved converter with a plurality of modules. The inductor assembly will in this case comprise a first core for each of the modules, wherein the first conductors on each of the first cores each correspond to a phase of the respective module. The second core comprises a leg for each of the modules and the second conductors on each leg correspond to the respective module.

In some embodiments, the first magnetic core may comprise a first core material and the second core may comprise a second core material different from the first core material. For example, the first magnetic core may be made from a low loss material, particularly ferrite or an amorphous core material while the second core may be made from a high flux density material such das Si—Fe or a powdered core material. In some embodiments, a high flux density material allows the second core be smaller reducing winding losses and enhancing overall efficiency.

In some embodiments, when using a high flux density material for the second core, these materials are typically stronger and can be made to support the overall inductor assembly. The second core may then be arranged to substantially surround the first magnetic core. In this way the second core will provide magnetic shielding reducing the stray inductance and thus reducing additional losses and problems in external components.

Figure 1:
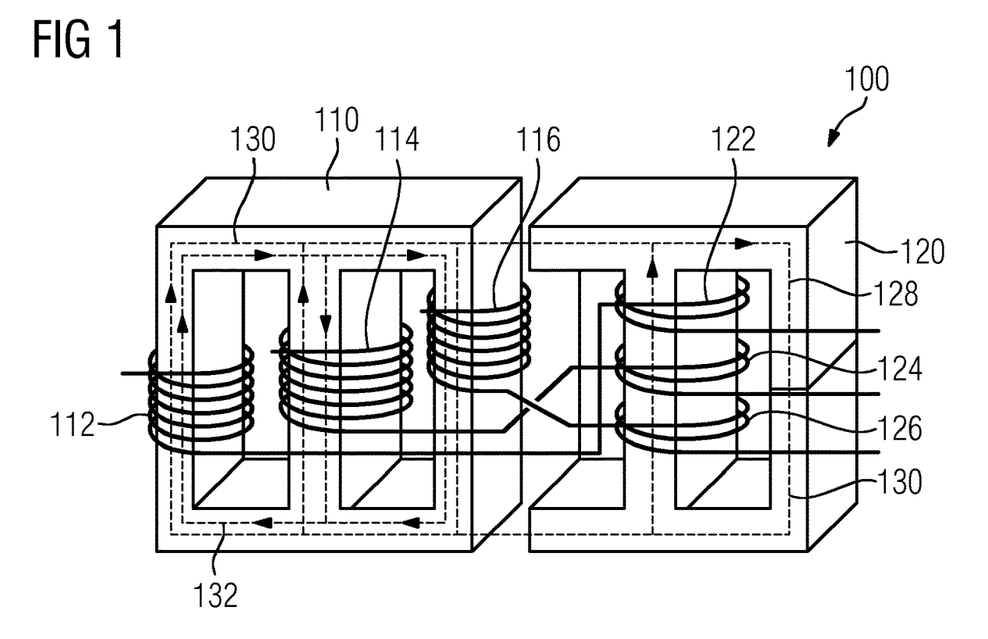
FIG. 1 illustrates an embodiment of an inductor assembly incorporating teachings of the present disclosure.

FIG. 1 illustrates a first embodiment of the teachings herein. An inductor assembly 100 comprises a first core 110 and a second core 120. The first core is an EE shaped three leg core. As is well known a EE shaped core comprises two parts separated by an air gap or low permeability material where both parts are shaped identically in the form of a the capital letter E having a backside bar with equally spaced arms extending from the backside bar and wherein the parts are oriented to make the arms of the two E shapes point towards each other. The direction in which the backside bar of the E shape extends will herein be called the x-direction, while the direction that the legs of the first core extend in will be called the y-direction. Thus, the E shape extends in the notional x-y-plane. In the spatial direction perpendicular to the x-y-plane of the E shape, which will be called the z-direction, the first core has a uniform thickness.

A three-legged first core is usually associated with a three parallel interleaved phase setup. Therefore, the inductor assembly 100 comprises three first conductors 112, 114, 116. The first conductors 112, 114, 116 are each arranged on its own leg of the first core. Each of the first conductors 112, 114, 116 corresponds to one of the three parallel interleaved phases. The first conductors 112, 114, 116 are all wound in the same orientation and thus inversely coupled.

The second core 120 of the inductor assembly 100 is formed in an FF shape, which in analogy with the EE shape means it comprises two parts of capital letter F shape separated by an air gap or low permeability material. The second core 120 thus has two legs. In contrast to the EE shape the FF shape has open ended backside bars. The second core and the first core 110, 120 are arranged adjacent to each other in the x-direction so that the open ends of the backside bars point towards the first core 110 but leave an air gap.

The inductor assembly 100 comprises second conductors 122, 124, 126 that are arranged on the second core 120. In contrast to the first conductors 112, 114, 116 that are spread out to separate legs the second conductors 122, 124, 126 are all arranged in a stacked manner on a single leg of the second core 120. Each of the second conductors 122, 124, 126 is again associated with one of the phases and is electrically connected in series with the first conductor 112, 114, 116 corresponding to the same phase. The second conductors 122, 124, 126 are wound in the same way as the first conductors 112, 114, 116 and are thus inversely coupled to the first conductors 112, 114, 116. Among themselves the second conductors 122, 124, 126 are positively coupled.

The first conductors 112, 114, 116 produce identical fundamental voltages and high frequency circulating current. The circulating currents are phase shifted by 120 degrees between the first conductors 112, 114, 116. The generated distributed mode flux can flow through the magnetic structure of the inductor assembly 100 producing a differential mode inductor. Common mode flux generated in the first core 110 by the first conductors 112, 114, 116 has no path (only through the air) to flow within the first core 110 when core 120 is absent.

In the presence of second core 120 the common mode flux produced by the three phases can flow through the second leg 128 that has no conductors arranged on it, which means the second core 120 acts as a common mode inductor. The differential mode flux 132 from circulating currents is phase shifted by 120° between the conductors from interleaved phases. It can flow within the first core 110 and will typically cancel itself within the first core 110. Therefore, it will typically have no effect in the second core 120.

In the combined inductor assembly 100 common mode flux 130 from the first core 110 receives a path to flow within the second core 120. This increases the common mode inductance of the inductor assembly over that of the first core 110 alone. This means the number of winding turns can be reduced for a common mode filter while maintaining the same inductance. Reducing the windings of the conductors reduces the overall volume of the inductor assembly 100. The length of the air gap between the first core 110 and the second core 120 can be adjusted to avoid core saturation due to fundamental flux.

Figure 2:
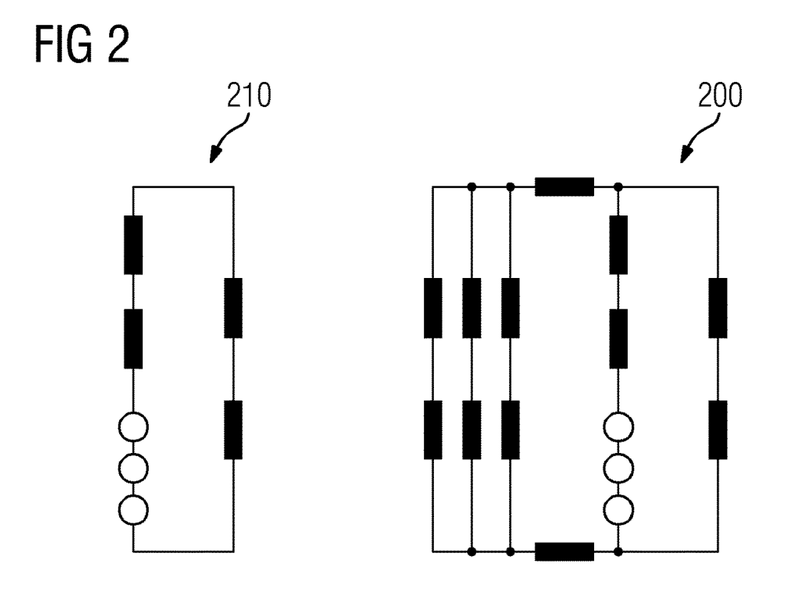
FIG. 2 illustrates an equivalent circuit for the inductor assembly of FIG. 1.

FIG. 2 shows the equivalent circuit 200 of the inductor assembly 100 of FIG. 1 as well as the equivalent circuit 210 of only the second core 120. The equivalent circuit 200 represents the ampere turns (NxIx) of each phase and the reluctance of the magnetic (Rmag) and air-gap (Rair) paths. Compared to the equivalent circuit 210 of the second core 120 alone the equivalent circuit 200 of the inductor assembly has additional parallel reluctances due to the combination of the first and second cores 110, 120. The effective reluctance of the total circuit is reduced by the additional parallel reluctance which increases the common mode flux 130 (flux=ampere turns/reluctance or phi=NI/R) for the same ampere turns. The result is that the common mode inductance (inductance=flux*turns/current, L=phi*N/I) is increased for the same number of turns in the combined inductor assembly 100 over the second core 120 alone.

Figure 3:
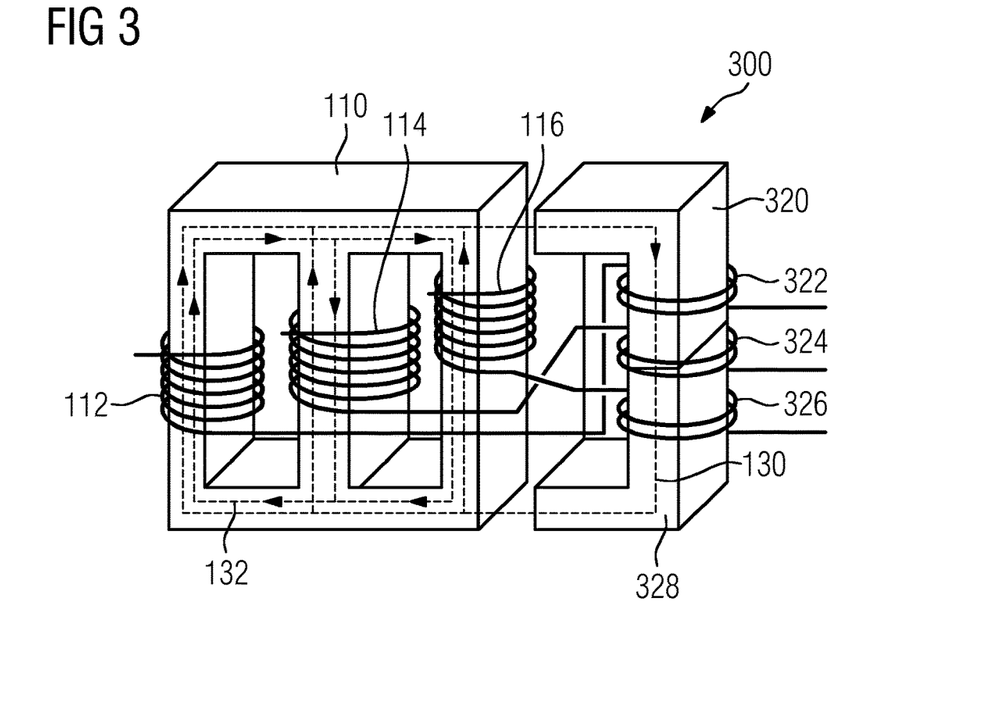
FIGS. 3 and 4 illustrate further embodiments of inductor assemblies incorporating teachings of the present disclosure.

FIG. 3 illustrates a second possible embodiment of the teachings of the present disclosure. The inductor assembly 300 of FIG. 3 comprises a first core 110 that is equal to the first core 110 of inductor assembly 100 of FIG. 1. It is EE shaped and three first conductors 112, 114, 116 are arranged on its three legs as in inductor assembly 100. As in inductor assembly 100 the three conductors 112, 114, 116 are arranged to be inversely coupled to each other, i.e. they are wound in a similar fashion. Inductor assembly 300 further comprises a second core 320. The second core 320 of inductor assembly 300 is formed in an LL shape, which in analogy with the EE shape means it comprises two parts of capital letter L shape separated by an air gap or low permeability material. The second core 320 thus has a single leg 328. Much like the FF shape the LL shape has open ended backside bars. The second core and the first core 110, 320 are arranged adjacent to each other in the x-direction so that the open ends of the backside bars point towards the first core 110 but leave an air gap.

As with the inductor assembly 100, the inductor assembly 300 comprises second conductors 122, 124, 126 that are arranged on the single leg 328 of the second core 320. In contrast to the first conductors 112, 114, 116 that are spread out to separate legs the second conductors 122, 124, 126 are all arranged in a stacked manner. Each of the second conductors 122, 124, 126 is again associated with one of the phases and is electrically connected in series with the first conductor 112, 114, 116 corresponding to the same phase.

Contrary to inductor assembly 100, the winding direction of the second conductors 122, 124, 126 is the opposite of the winding direction of the first conductors 112, 114, 116. The second conductors 122, 124, 126 are thus positively coupled to the first conductors 112, 114, 116 as well as among themselves. This means that there is a closed path for common mode magnetic flux 130 from each of the first conductors 112, 114, 116 through leg 328 of the second core 320.

If inductor assembly 100, 300 is used in an interleaved converter, the common mode noise is at three times the switching frequency, so the inductance required by the inductor is small. In this case the air gap can be increased to reduce the fundamental flux (which is also the common mode flux at core 110) in order to minimize the inductor volume for the common mode inductor, i.e. the second core 320.

Figure 4:
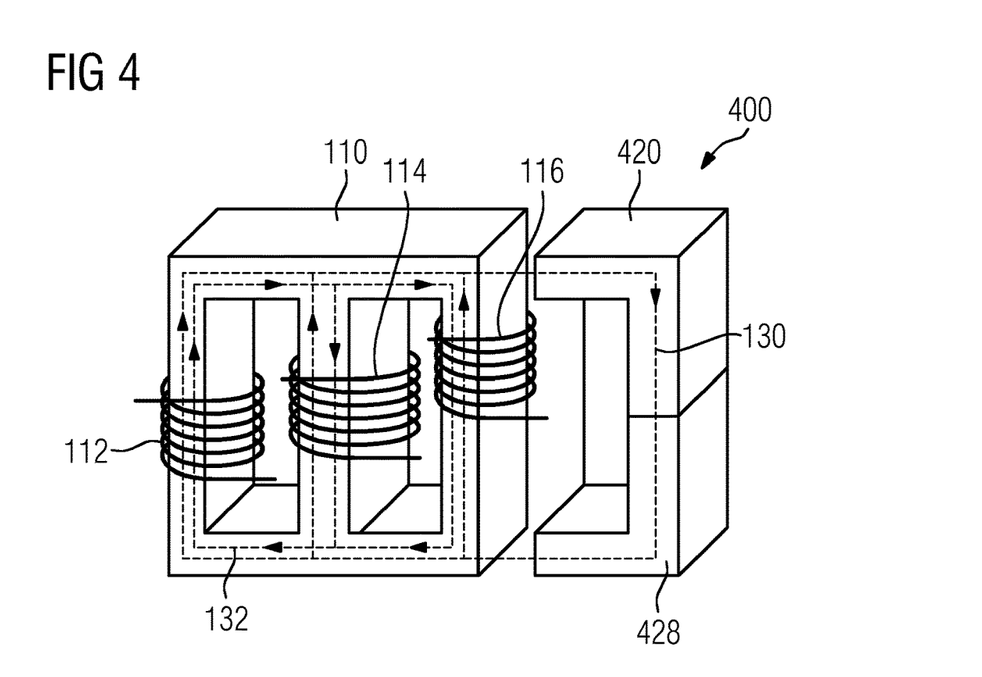

FIG. 4 illustrates a third embodiment of the teachings of the present disclosure. The inductor assembly 400 of FIG. 4 comprises a first core 110 that is equal to the first core 110 of inductor assembly 300 of FIG. 3. It is EE shaped and three first conductors 112, 114, 116 are arranged on its three legs as in inductor assembly 300. As in inductor assembly 300 the three conductors 112, 114, 116 are arranged to be inversely coupled to each other, i.e. they are wound in a similar fashion.

Inductor assembly 400 further comprises a second core 420. The second core 420 of inductor assembly 400 is formed in an LL shape as in inductor assembly 300 of FIG. 3. The second core and the first core 110, 420 are arranged adjacent to each other in the x-direction so that the open ends of the backside bars point towards the first core 110 but leave an air gap.

Contrary to the first and second embodiment described, inductor assembly 400 does not comprise second conductors. The common mode flux 130 produced by the three-phase differential mode inductor, i.e. the first core 110, can be used to provide the necessary inductance. The number of turns and the air gap need to be adjusted to obtain the necessary inductance. The combined structure of the first and second core 110, 420 will also have influence on the differential mode noise 132 and increase the differential mode inductance. Due to stray fields the reluctance of the three-phase differential mode inductor legs is not completely equal. Any unbalanced differential mode flux 132 resulting from the unequal reluctance will flow through the additional leg 428 provided by the common mode inductor, i.e. the second core 420, thereby increasing the differential mode inductance.

While the embodiments all featured a three-legged first core 110 suitable for a three-phase converter setup, their concept can be generalized for any number of parallel modules or phases. The number of legs and the number of first conductors 112, 114, 116 in the differential mode inductor, i.e. the first core 110, is equal to the number of parallel modules or phases. In case the inductor assembly comprises second conductors 122, 124, 126 the number of second conductors 122, 124, 126 is also equal to the number of parallel modules or phases with the second conductors 122, 124, 126 being arranged on a single leg of the second core 120, 320.

In some embodiments, the inductor assemblies 100, 300, 400 provide a differential mode and a common mode inductor in a single compact setup. Coupling the cores 110, 120, 320, 420 of the inductor assemblies leads to increased values of the inductance that can in turn be used to reduce the number of windings of the first conductors 112, 114, 116. Reducing the number of windings leads to a reduced flux in the magnetic path which allows reducing the volume and thus weight and cost of the inductor assembly.

Figure 5:
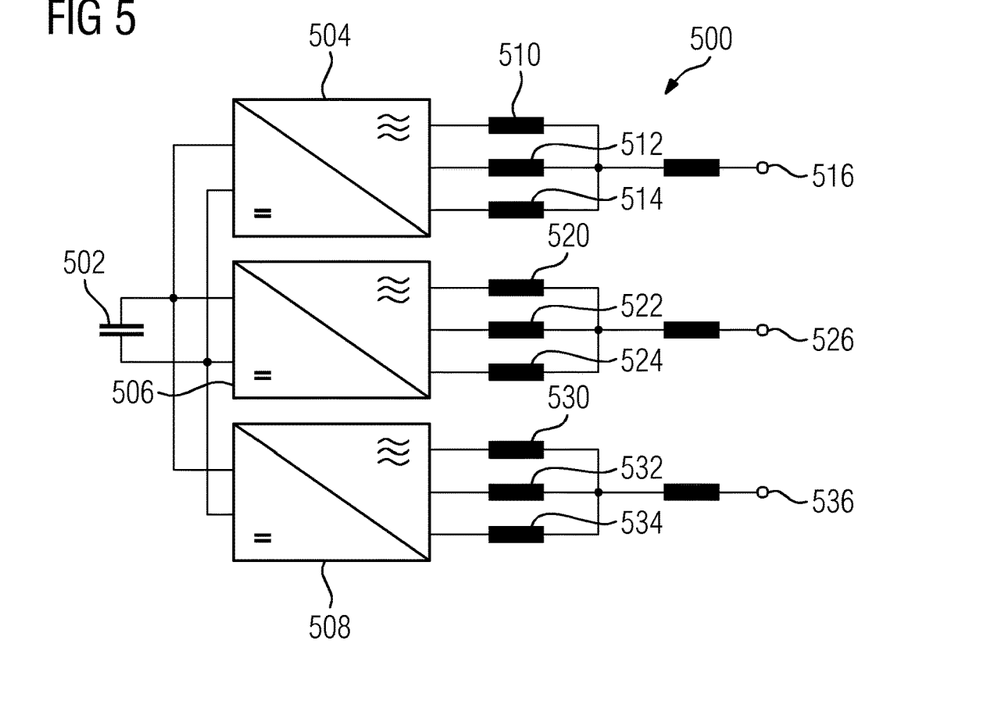
FIG. 5 illustrates a schematic setup of an interleaved converter incorporating teachings of the present disclosure.

In some embodiments, the cores 110, 120, 320, 420 are arranged in a combined setup instead of being just arranged in proximity. The combined setup of the cores will remove the possibility of core saturation from stray flux that the cores 110, 120, 320, 420 induce in each other. Further advantageous embodiments can be employed for example in interleaved converters such as the simplified converter of FIG. 5. FIG. 5 shows a three-phase interleaved DC/AC converter 500 with three parallel modules per phase.

In a first phase, a three-module inverter 504 is connected to a DC supply 502 at its input terminals. The three output terminals are connected each to one inductivity 510, 512, 514 the far sides of which are joined and connected to an AC terminal 516 for the first phase. In a similar manner, for a second phase a three-module inverter 506 is connected to the DC supply 502 at its input terminals. The three output terminals are connected each to one inductivity 520, 522, 524, the far sides of which are joined and connected to an AC terminal 526 for the second phase. For a third phase a three-module inverter 508 is connected to the DC supply 502 at its input terminals and the three output terminals are connected each to one inductivity 530, 532, 534, the far sides of which are joined and connected to an AC terminal 536 for the third phase.

The inductor assembly 300 of FIG. 3 may be used in interleaved converter 500. Inductor assembly 300 can be used for any or all of the phases of interleaved converter 500. For the first phase the first conductors 112, 114, 116 represent the inductivities 510, 512, 514 of the three modules of the first phase. As described, the second conductors 122, 124, 126 are wound oppositely to the first conductors, allowing the second core 320 to act as a common mode inductor. In the same manner, additional inductor assemblies 300 can be used for the second and third phase of interleaved conductor 500 so that it uses a total of three inductor assemblies with three first and three second cores 110, 320.

The paths for the differential mode flux and the common mode flux are those that are shown in FIG. 3. Since the winding direction of the first conductors 112, 114, 116 and the second conductors 122, 124, 126 are opposite to each other the combined fluxes add and thereby increase the inductance. The first core 110 handles the high frequency circulating current which is generated by the phase shifted switching strategy of interleaved converter 500. When the differential mode current is symmetric (the frequency of the dominant magnitude of this current is equal to the switching frequency of the individual modules), there will be no differential mode flux in leg 328 of the second core 320 because the differential mode fluxes are mutually phase shifted by 120 degrees and the sum of these three fluxes is zero.

The second core 320 thus forms a common mode inductor. In interleaved converter 500 the common mode fluxes consist of the fundamental flux and high frequency flux with a frequency of N times the switching frequency, where N is the number of parallel modules. In the embodiment of FIG. 5 the number of parallel modules N=3. Although the magnitude of the common mode flux is higher due to the presence of the fundamental flux, the inductance requirement is very low, because the common mode inductor is designed to only handle common mode noise at a frequency of N times of the switching frequency. The advantage is that a large air gap can be used to avoid core saturation due to fundamental flux.

For interleaved converter 500, the common mode currents produced by the combination of parallel modules are phase shifted by 120 degrees (when 3 parallel modules are used). This means that they act as differential mode components to each other. For the first phase of interleaved converter 500, this current is a circulating current within the inductivities 510, 512, 514. The same is true for the other phases. The output current of each of the phases of interleaved converter 500—the current flowing through terminals 516, 526, 536—is the fundamental current at a frequency of 3 times the switching frequency. For each of the phases the summed current of the modules is a common mode current. When seen with respect to all three phases together these individual phase current components are also differential mode components that are again phase shifted by 120 degrees from each other.

Figure 6:
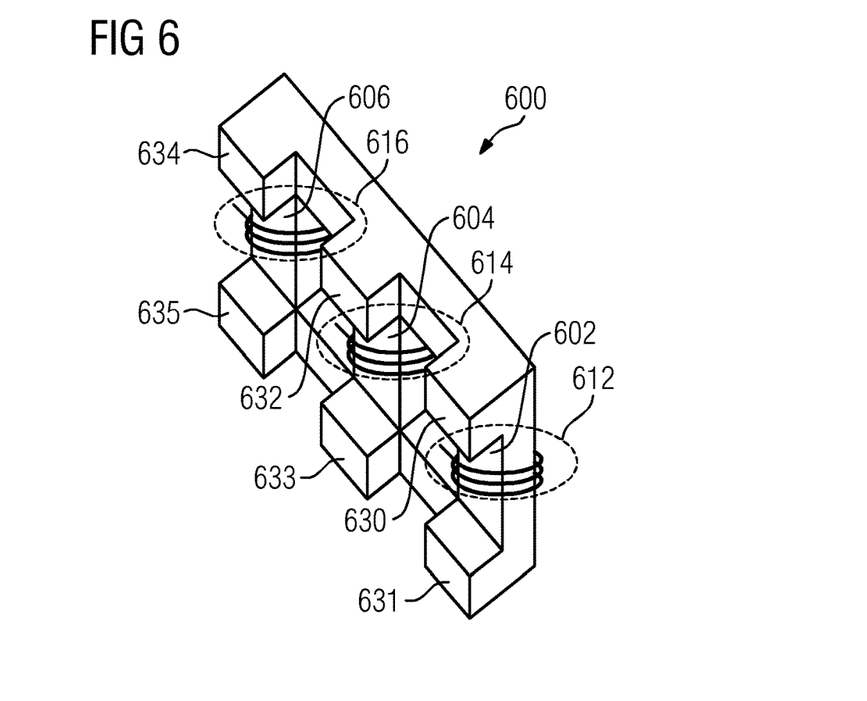
FIG. 6 illustrates an embodiment of a combined common mode inductor for the interleaved converter of FIG. 5.

In the embodiment of FIG. 6, the second cores 320 of the three inductor assemblies 300 are replaced with a second core 600 that is a single structure and that acts as both a common mode inductor for the first cores 110 as well as a differential mode inductor for the conductors of the former second cores 320. In the embodiment of FIG. 6, second core 600 is shaped as a multi-leg core in the z direction with three legs 612, 614, 616. In some embodiments, second core 600 is shaped as a EE core in the z direction. In the x direction, second core 600 retains the protrusions 630 . . . 635 that make up the LL shape of FIG. 3. Second core 600 has three pairs of such protrusions 630 . . . 635 located at the three areas in the z direction where its legs 612, 614, 616 are. In some embodiments, the protrusions 630 . . . 635 could be removed from the second core 600 and instead added to associated first cores 110.

Thus, contrary to the previous embodiments of inductors the second core 600 has a fully three-dimensional structure in that in the y-z-plane the second core 600 has the shape of a multi-leg core, such as an EE shape, not limited to three arms. In the x-y-plane at the z coordinate where legs 612, 614, 616 are located the second core 600 has an LL shape.

Figure 7:
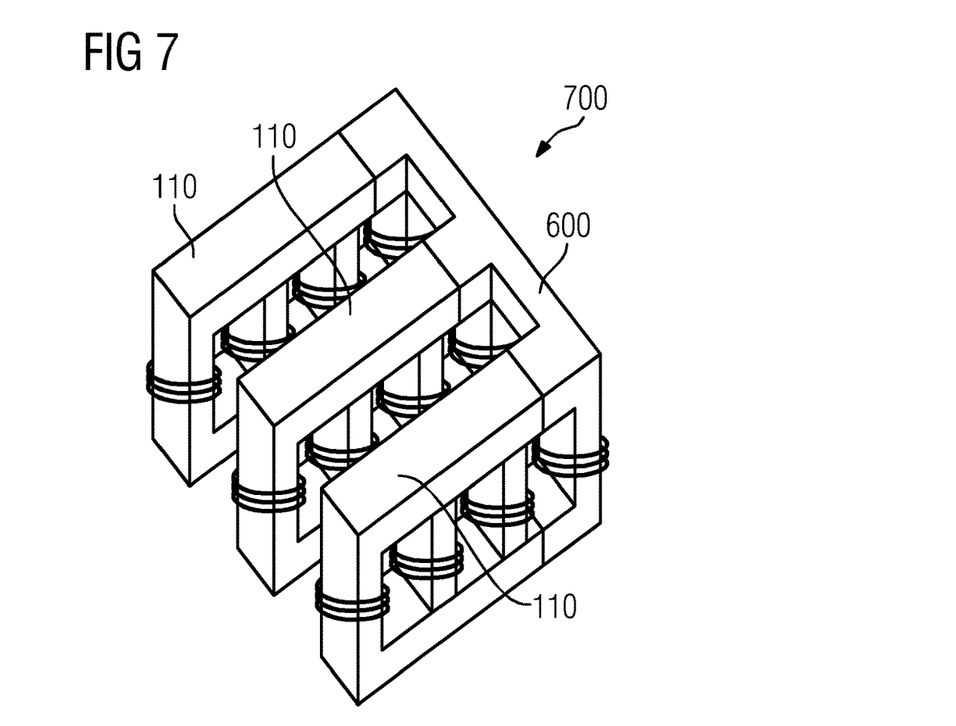
FIGS. 7 and 8 illustrate further embodiments of combined inductor assemblies for the interleaved converter of FIG. 5.

In the second core 600, the second conductors 122, 124, 126 for each of the phases are located at the leg 612, 614, 616 associated with that phase. The second conductors 122, 124, 126 at one of the legs 612, 614, 616 represent conductors for the parallel modules of interleaved converter 500. The complete structure of the combined differential mode and common mode inductor 700 is shown in FIG. 7. In addition to second core 600, combined inductor 700 comprises a first core 110 for each of the phases of interleaved converter 500, in this particular embodiment, three first cores 110. The first cores 110 are oriented along the x direction and arranged parallel to each other.

Other embodiments of the combined differential mode and common mode inductor may be modified. When the inductor is used in an interleaved converter with a different number N of parallel modules from three, the first cores 110 may be modified to have N legs with respective N first conductors 112, 114, 116 arranged on the legs. The same number of N second conductors 122, 124, 126 are then wound at each of the legs of second core 600. When the interleaved converter has a different number of phases K the number of first cores 110 used is set to K and the number of legs 612, 614, 616 of the second core 600 is adjusted to be equal to K.

Figure 8:
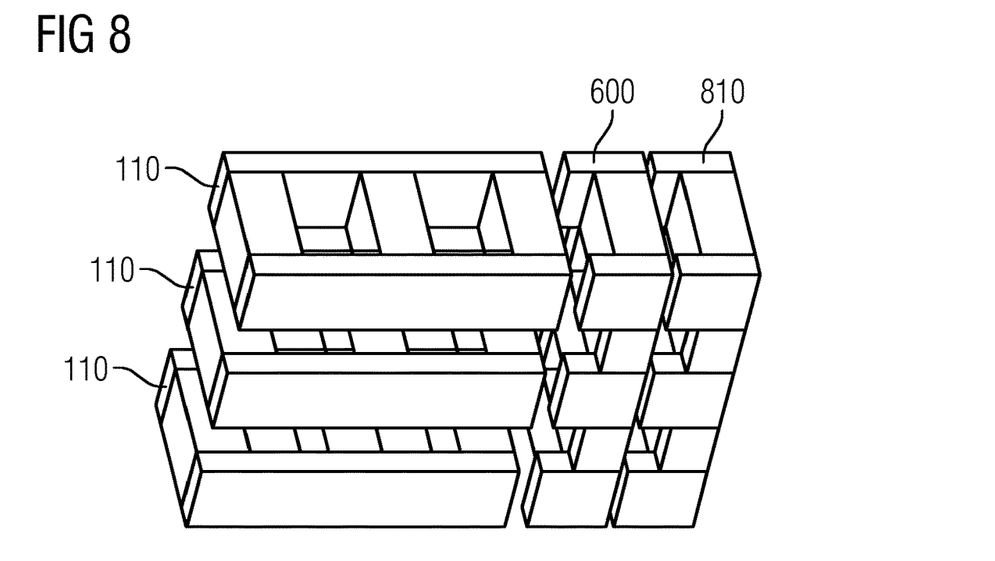

The combined differential mode and common mode inductor may comprise one or more additional second cores 810. FIG. 8 shows an embodiment of the combined differential mode and common mode inductor with one additional second core 810. The additional second core 810 is located adjacent to second core 600, translated in the x direction so that protrusions 630 . . . 635 leave air gaps to the second core 600. In this way a setup for an interleaved converter 500 similar to the one of FIG. 1 can be created. In the structure of FIG. 8 the second conductors 122, 124, 126 may be wound in the same manner as the first conductors 112, 114, 116 and the additional second core 810 does not have second conductors but instead acts as a common mode inductor for the first conductors 112, 114, 116.

What is claimed is:

1. An inductor assembly for a converter, the assembly comprising:
a plurality of first conductors arranged on respective legs of a first magnetic core;
a second magnetic core with one or more legs, the second core magnetically coupled to the first core via an air-gap and arranged to provide a path for common mode magnetic flux of the plurality of first conductors; and
a respective second conductor corresponding to each of the plurality of first conductors;
wherein each pair of first and second conductors is electrically connected in series; and
the second conductors are arranged on a single leg of the second core and positively coupled to each other.

2. The inductor assembly of claim 1, wherein pairs of the first conductors are inversely coupled to one another.

3. The inductor assembly of claim 1, wherein the pairs of corresponding first and second conductors are positively coupled.

4. The inductor assembly of claim 1, wherein the second core is LL-shaped.

5. The inductor assembly of claim 1, wherein:
each pair of the corresponding first and second conductors is inversely coupled; and
the second core comprises at least two legs.

6. The inductor assembly of claim 5, wherein the second core comprises exactly two legs.

7. The inductor assembly of claim 6, wherein the second core is FF shaped.

8. The inductor assembly of claim 1, wherein:
the first magnetic core comprises a first core material; and
the second core comprises a second core material different from the first core material.

9. The inductor assembly of claim 1, wherein the second core at least partially surrounds the first magnetic core.

10. The inductor assembly of claim 1, wherein:
the second core includes a multi-leg core in a first direction; and
at least some of the plurality of first cores are arranged to extend in a second direction to be magnetically coupled to the legs of the second core.

11. The inductor assembly of claim 10, wherein:
at the locations of the legs the second core is LL-shaped with the arms of the LL shape extending in the second direction; and
the first cores are arranged adjacent to the arms of the LL shape.

12. The inductor assembly of claim 10, further comprising a third core shaped like the second core and arranged adjacent to the second core in the second direction on a side opposite to the plurality of first cores.

13. A multiple phase converter comprising:
an inductor assembly comprising:
a plurality of first conductors arranged on respective legs of a first magnetic core;
a second magnetic core with one or more legs, the second core magnetically coupled to the first core via an air-gap and arranged to provide a path for common mode magnetic flux of the plurality of first conductors; and
a respective second conductor corresponding to each of the plurality of first conductors;
wherein each pair of first and second conductors is electrically connected in series;
the second conductors are arranged on a single leg of the second core and positively coupled to each other;
the first core has a respective leg for each of the phases; and each of the plurality of first conductors corresponds to one of the phases.

14. A multiple phase converter according to claim 13, wherein:
the multiple phase converter comprises a three-phase converter; and
the first core is EE shaped with three legs.

15. A multiple phase interleaved converter comprising:
a plurality of modules; and
an inductor assembly comprising:
 a plurality of first conductors arranged on respective legs of a first magnetic core;
 a second magnetic core with one or more legs, the second core magnetically coupled to the first core via an air-gap and arranged to provide a path for common mode magnetic flux of the plurality of first conductors; and
 a respective second conductor corresponding to each of the plurality of first conductors;
wherein each pair of first and second conductors is electrically connected in series;
the second conductors are arranged on a single leg of the second core and positively coupled to each other;
additional first cores for each of the plurality of modules;
wherein the respective first conductors on each of the first cores correspond to a phase of the respective module;
the second core comprises a respective leg for each of the modules; and
the second conductors on each leg correspond to the respective module.

* * * * *